3,028,311
Patented Apr. 3, 1962

3,028,311
PROCESS FOR PREPARING 6-DEMETHYL-TETRACYCLINES
David Perlman and Leon J. Heuser, Princeton, N.J., assignors to Olin Mathieson Chemical Corporation, New York, N.Y., a corporation of Virginia
No Drawing. Filed Aug. 5, 1960, Ser. No. 47,618
8 Claims. (Cl. 195—80)

This invention relates to an improved process for the production of 6-demethyltetracyclines and, more particularly, to an improvement in the process of producing 6-demethyltetracyclines by culturing tetracycline-producing strains of *Streptomyces aureofaciens*.

Prior to the present invention, 6-demethyltetracyclines have been produced by culturing selected mutant strains of *S. aureofaciens* in contact with nutrient media of varying compositions. The antibiotics thus produced are characterized by extreme chemical stability, notably in strong acid and alkali solutions, and by their increased retention in the circulatory system of man. Hence, the therapeutic importance of the 6-demethyltetracyclines is unquestionable. It is, therefore, desirable that the simplest and most effective procedures for the production of these antibiotics be provided. This means, of course, that it is highly desirable to achieve the production of 6-demethyltetracyclines with a minimum of restriction on the source of microorganism which can be employed and without the burden of selecting particular strains of microorganisms for use in the fermentation process for producing 6-demethyltetracyclines.

It has been found in accordance with the present invention that the 6-demethyltetracyclines can be produced in good yield from any tetracycline-producing strain of *S. aureofaciens* when a sulfonamide compound is added to a growing culture of a tetracycline-producing strain of *S. aureofaciens* or to the collected cells separated from a fermentation medium in which a tetracycline-producing strain of *S. aureofaciens* has been cultured.

Among the tetracycline-producing strains of *S. aureofaciens* which have been successfully employed in the preparation of 6-demethyltetracyclines by the novel process of the present invention are the following: *S. aureofaciens* ATCC 13899; *S. aureofaciens* ATCC 13900; *S. aureofaciens* ATCC 12416a; *S. aureofaciens* ATCC 12416b; *S. aureofaciens* ATCC 12416c; *S. viridofaciens* ATCC 11989; *S. aureofaciens* NRRL B1288; *S. aureofaciens* NRRL 2209; *S. aureofaciens* NRRL B1286; *S. aureofaciens* NRRL B1287.

The sulfonamide compounds which have been found to be suitable for use in the novel process of this invention are sulfanilamide and its derivatives. These compounds form a well-recognized group of organic medicinal products and are widely known as the "sulfa" drugs. Included among these compounds are sulfanilamide and the following derivatives thereof: sulfadiazine (N'-2-pyrimidylsulfanilamide); sulfamerazine [4'-(4-methyl-2-pyrimidyl)sulfanilamide]; sulfamethazine [N'-(4,6-dimethyl-2-pyrimidyl)sulfanilamide]; sulfaguanidine (sulfanilylguanidine monohydrate); sulfacetamide (N-sulfanilylacetamide); sulfapyridine (N'-2-pyridylsulfanilamide); sulfathiazole (N'-2-thiazolylsulfanilamide); succinyl sulfathiazole [p-(2-thiazolylsulfamyl)succinanilic acid]; p-nitrosulfathiazole [2 - (p - nitrophenylsulfonamido)thiazole]; sulfamethylthiazole (N'-4-methyl-2-thiazolylsulfanilamide); sulfisoxazole (N'-3,4-dimethyl-5-isoxazolylsulfanilamide); N4-benzylsulfanilamide and N-(2-thiazolyl)-1-phenol-4-sulfonamide.

The fermentation procedure employed in the novel process of the present invention may be carried out in accordance with the conditions generally employed in the production of tetracycline. Thus, the nutrient medium, conditions of time, temperature and pH control, aeration, and the like will conform to those employed in the production of tetracycline as set out in U.S. Patent No. 2,734,018.

If a source of biologically available chloride is included in the fermentation medium then the chlorodemethyltetracycline, i.e., 7-chloro-6-demethyltetracycline, will be formed together with some 7-chlorotetracycline. If no source of biologically available chloride is present, then 6-demethyltetracycline will be formed together with a certain amount of tetracycline.

The following examples are illustrative of the practice of this invention:

EXAMPLE 1

A culture of *Streptomyes aureofaciens* (ATCC 13900) is grown in approximately 50 ml. of an aqueous medium containing, per 100 ml., 5 gms. extraction process soybean meal, 5 gms. glucose and 0.5 gm. calcium carbonate in a 250 ml. Erlenmeyer flask. The flasks are agitated on a rotary shaker (280 cycles per minute) in a room maintained at 25° C. for a period of 72 hours. 0.5 ml. of the resulting inoculum is then employed for the inoculation of 50 ml. of an aqueous medium containing, per liter, 50 gms. extraction process soybean meal, 50 gms. glucose, 10 gms. sodium chloride and 5 gms. calcium carbonate, in a 250 ml. Erlenmeyer flask. 1 ml. of a solution of sulfaguanidine in 0.5 N HCl having a concentration of 1 gm. of sulfaguanidine per 20 ml. of solution is added to the flask and the flask is shaken on a rotary shaker at 280 cycles per minute at 25° C. for five days. A 5 ml. aliquot is then removed, acidified to pH 2 by the addition of sulfuric acid and centrifuged. Examination of the supernatant liquid by paper chromatography employing the methods of Bohonos et al. (Antibiotics Annual 1953–4, page 49) and of Selzer and Wright [Antibiotics and Chemotheraphy, volume 6, page 292 (1956)] demonstrates the presence of 7-chloro-6-demethyltetracycline and of 7-chlorotetracycline.

EXAMPLE 2

A culture of *Streptomyces aureofaciens* (ATCC 13900) is grown in approximately 50 ml. of an aqueous medium containing, per 100 ml., 5 gms. soybean meal, 5 gms. glucose, and 0.5 gm. calcium carbonate in a 250 ml. Erlenmeyer flask. The flasks are agitated on a rotary shaker (280 cycles per minute) in a room maintained at 25° C. for a period of 72 hours. 0.5 ml. of the resulting inoculum is then employed for the inoculation of 50 ml. of an aqueous medium containing, per liter, 50 gms. extraction process soybean meal, 50 gms. glucose, and 5 gms. calcium carbonate, in a 250 ml. Erlenmeyer flask. 1 ml. of a suspension of sulfaguanidine in water having a concentration of 1 gm. of sulfalguanidine per 20 ml. of solution is added to the flask and the flask is shaken on a rotary shaker at 280 cycles per minute at 25° C. for five days. A 5 ml. aliquot is then removed, acidified to pH 2 by the addition of sulfuric acid and centrifuged. Examination of the supernatant liquid by paper chromatography employing the methods of Bohonos et al. (Antibiotics Annual 1953–4, page 49) and of Selzer and Wright [Antibiotics and Chemotheraphy, volume 6, page 292 (1956)] demonstrates the presence of 6-demethyltetracycline and 7-chloro-6-demethyltetracycline as well as tetracycline and 7-chlorotetracycline.

EXAMPLE 3

A culture of *Streptomyces aureofaciens* (ATCC 13900) is grown in 50 ml. of a medium comprised of extraction process soybean meal, 50 gms., glucose, 50 gms., calcium carbonate, 5 gms. and water to 1 liter contained in a 250 ml. Erlenmeyer flask for 72 hours at 25° C. on a rotary shaker operated at 280 cycles per minute. The entire contents of the flask are transferred to a 4 liter flask containing 1 liter of the same medium. The resulting culture is incubated for 48 hours at 25° C. on a reciprocating shaker operating at 120 2 inch cycles per minute. At the completion of this incubation period 300 ml. of the resulting mycelial growth is suspended in 1 liter of the original medium. 300 ml. of this culture is then employed for the inoculation of 30 liters of the following sterile medium: 5.0% soybean meal, 5.0% British gum, 0.6% $CaCO_3$, 0.25% Foamex, 0.25% prime burning oil, 0.1% NaCl and sufficient tap water to bring the volume to 30 liters. The fermentation is carried out with continuous agitation at a temperature of 25° C. for six days. During the fermentation the medium is aerated at the rate of 1.0 ft./min. for the first 24 hours and at the rate of 2.0 ft./min. to harvest. After 15 hours' incubation a solution of 9 grams of sulfaguanidine in liter of 0.5 N HCl is added, and the fermentation thereafter is carried out in the presence of the added sulfaguanidine.

After six days' incubation, the whole broth from the fermentation is acidified to pH 1.5, filtered with the aid of Hyflo, and the cake washed with sufficient water to retain the original volume. Twelve liters of the acid filtrate containing about 1 mg./ml. of a mixture of chlortetracycline and 7-chloro-6-demethyltetracycline is extracted at pH 9.0–9.5 with 4 liters of n-butanol. The solvent phase is acidified to pH 2.0 with 40% $H_2SO_4$ and the solution allowed to stand in the cold room overnight. After clarification, the solvent is removed under high vacuum in the presence of water. The resulting aqueous concentrate is adjusted to pH 2.9 with 40% NaOH and lyophilized. 15 grams of crude mixture is obtained with about 50% of the bioactivity of pure 7-chloro-6-demethyltetracycline.

The chlortetracycline in the product is hydrolyzed with acid under conditions where the 7-chloro-6-demethyltetracycline is found to be relatively stable. This is done by dissolving 7 g. of the crude concentrate in a mixture of 700 ml. $H_2O$ and 70 ml. concentrated HCl. After heating at 75–80° C. for 30 minutes, the solution is cooled and neutralized to pH 1.8 with 40% NaOH. Decomposition products are removed from the solution by filtration and extraction with 20% (by volume) chloroform. The activity is then extracted from the solution using an equal volume of n-butanol. The butanol is removed under vacuum in the presence of water and the resulting solution freeze dried. Yield about 2.25 g. of crude 7-chloro-6-demethyltetracycline of about 50% purity. The crude material is converted to the crystalline hydrochloride by solution in methanol and acidification with concentrated HCl. 700 mg. of crystalline 7-chloro-6-demethyltetracycline hydrochloride is obtained. The product may be recrystallized as the hydrochloride from suitable solvents such as methanol-isopropanol mixtures or it can, if desired, be converted to the neutral form by crystallization from water at pH 5.0–5.5.

EXAMPLE 4

The same procedure used in Example 1 is carried out except that sulfadiazine is employed in place of sulfaguanidine. Examination of the supernatant liquid by the paper chromatographic methods employed in Example 1 shows the presence of 7-chloro-6-demethyltetracycline in the product which is obtained.

EXAMPLE 5

The procedure of Example 2 is used with the replacement of the sulfaguanidine with sulfathiazole. Examination of the supernatant liquid by the paper chromatographic methods employed in Example 1 shows the presence of 6-demethyltetracycline in the product which is obtained.

EXAMPLE 6

The procedure of Example 1 is used except that sulfapyridine is employed in lieu of the sulfaguanidine used in Example 1, and S. aureofaciens ATCC 13899 is used in place of S. aureofaciens ATCC 13900. Examination of the supernatant liquid by the paper chromatographic methods employed in Example 1 shows the presence of 7-chloro-6-demethyltetracycline in the product which is obtained.

EXAMPLE 7

The procedure of Example 1 is used except that succinyl sulfathiazole is employed in lieu of the sulfaguanidine used in Example 1. Examination of the supernatant liquid by the paper chromatographic methods employed in Example 1 shows the presence of 7-chloro-6-demethyltetracycline in the product which is obtained.

EXAMPLE 8

The procedure of Example 1 is used except that sulfaisoxazole is employed in lieu of the sulfaguanidine used in Example 1. Examination of the supernatant liquid by the paper chromatographic methods employed in Example 1 shows the presence of 7-chloro-6-demethyltetracycline in the product which is obtained.

The invention may be variously otherwise embodied within the scope of the appended claims.

What is claimed is:

1. A process for the production of 6-demethyltetracyclines which comprises cultivating a tetracycline-producing strain of Streptomyces aureofaciens in an aqueous nutrient medium under aerobic conditions in the presence of an inhibiting amount of a sulfonamide compound.

2. The process of claim 1 in which the sulfonamide compound is sulfaguanidine.

3. A process for the production of 7-chloro-6-demethyltetracycline which comprises cultivating a tetracycline-producing strain of Streptomyces aureofaciens in an aqueous nutrient medium containing an available source of chloride ions under aerobic conditions in the presence of an inhibiting amount of a sulfonamide compound.

4. The process of claim 3 in which the sulfonamide compound is sulfaguanidine.

5. A process for the production of 6-demethyltetracycline which comprises cultivating a tetracycline-producing strain of Streptomyces aureofaciens in an aqueous nutrient medium substantially free of available chloride ions under aerobic conditions in the presence of an inhibiting amount of a sulfonamide compound.

6. The process of claim 5 in which the sulfonamide compound is sulfaguanidine.

7. A process for the production of 6-demethyltetracycline which comprises cultivating a tetracycline-producing strain of Streptomyces aureofaciens in an aqueous nutrient medium substantially free of available chloride ion under aerobic conditions, separating the cells from the medium, treating the separated cells with an inhibiting amount of a sulfonamide compound and recovering the resulting physiologically active 6-demethyltetracycline.

8. The process of claim 7 in which the sulfonamide compound is sulfaguanidine.

References Cited in the file of this patent

UNITED STATES PATENTS 2,878,289    McCormick et al. _____ Mar. 17, 1959